United States Patent
Lee

(10) Patent No.: US 8,651,464 B2
(45) Date of Patent: Feb. 18, 2014

(54) RESILIENT RETURNING DEVICE FOR A POWER OPERATED PISTON TOOL

(75) Inventor: Chung-Yi Lee, New Taipei (TW)

(73) Assignee: Chung-Yi Lee, New Taipei (TW)

( * ) Notice: Subject to any disclaimer, the term of this patent is extended or adjusted under 35 U.S.C. 154(b) by 254 days.

(21) Appl. No.: 13/178,879

(22) Filed: Jul. 8, 2011

(65) Prior Publication Data

US 2013/0008302 A1    Jan. 10, 2013

(51) Int. Cl.
    *F16F 1/36*    (2006.01)
(52) U.S. Cl.
    USPC .......................................... 267/140; 173/211
(58) Field of Classification Search
    USPC ............. 267/292, 140, 153; 227/10; 173/211; 277/636
    See application file for complete search history.

(56) References Cited

U.S. PATENT DOCUMENTS

| | | | | |
|---|---|---|---|---|
| 168,845 A | * | 10/1875 | Pratt | 267/292 |
| 170,590 A | * | 11/1875 | Pratt | 267/292 |
| 3,301,335 A | * | 1/1967 | Snelling | 173/162.1 |
| 3,331,546 A | * | 7/1967 | Brunelle | 227/10 |
| 3,409,284 A | * | 11/1968 | Rix | 267/153 |
| 5,046,745 A | * | 9/1991 | Sweetland et al. | 277/634 |
| 5,599,029 A | * | 2/1997 | Umeno | 277/636 |
| 6,059,163 A | * | 5/2000 | Pfister et al. | 227/10 |
| 6,250,617 B1 | * | 6/2001 | Tews | 267/153 |
| 6,824,035 B1 | | 11/2004 | Lagodzinska | |
| 2010/0044939 A1 | * | 2/2010 | Hurwitz | 267/153 |

* cited by examiner

*Primary Examiner* — Bradley King
(74) *Attorney, Agent, or Firm* — Pillsbury Winthrop Shaw Pittman, LLP

(57) ABSTRACT

A resilient returning device for a power operated piston tool comprises a one piece elastic bellow-shaped body including a plurality of repeating pleats, each of which has two pleat halves that cooperatively define a first elbow therebetween. Each of the pleat halves of each of the pleats cooperates with an adjacent one of the pleat halves of an adjacent one of the pleats to define a second elbow therebetween. Each of the first and second elbows has a bulging side. The bellow-shaped body is formed with a plurality of loop-shaped grooves that are indented from the bulging sides of the first elbows of the pleats or the bulging sides of the second elbows of the pleats, respectively.

4 Claims, 6 Drawing Sheets

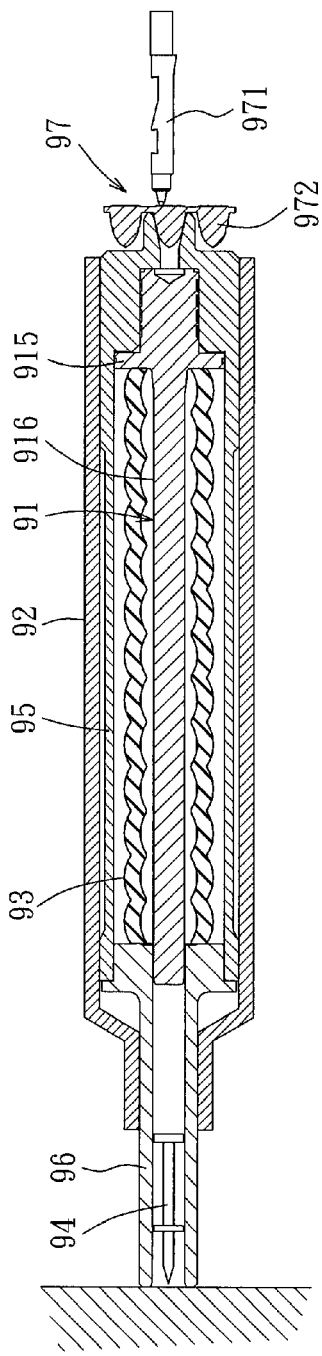
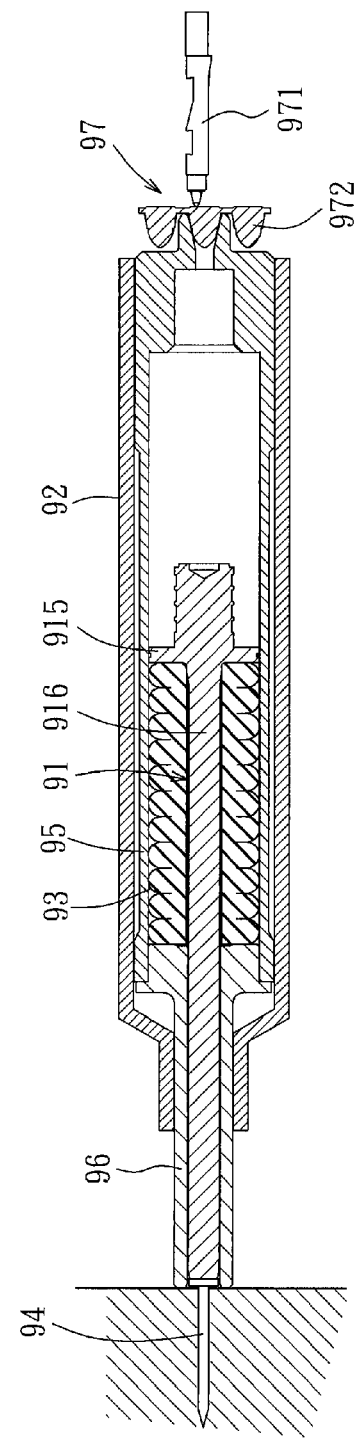
FIG. 1 PRIOR ART
FIG. 2 PRIOR ART

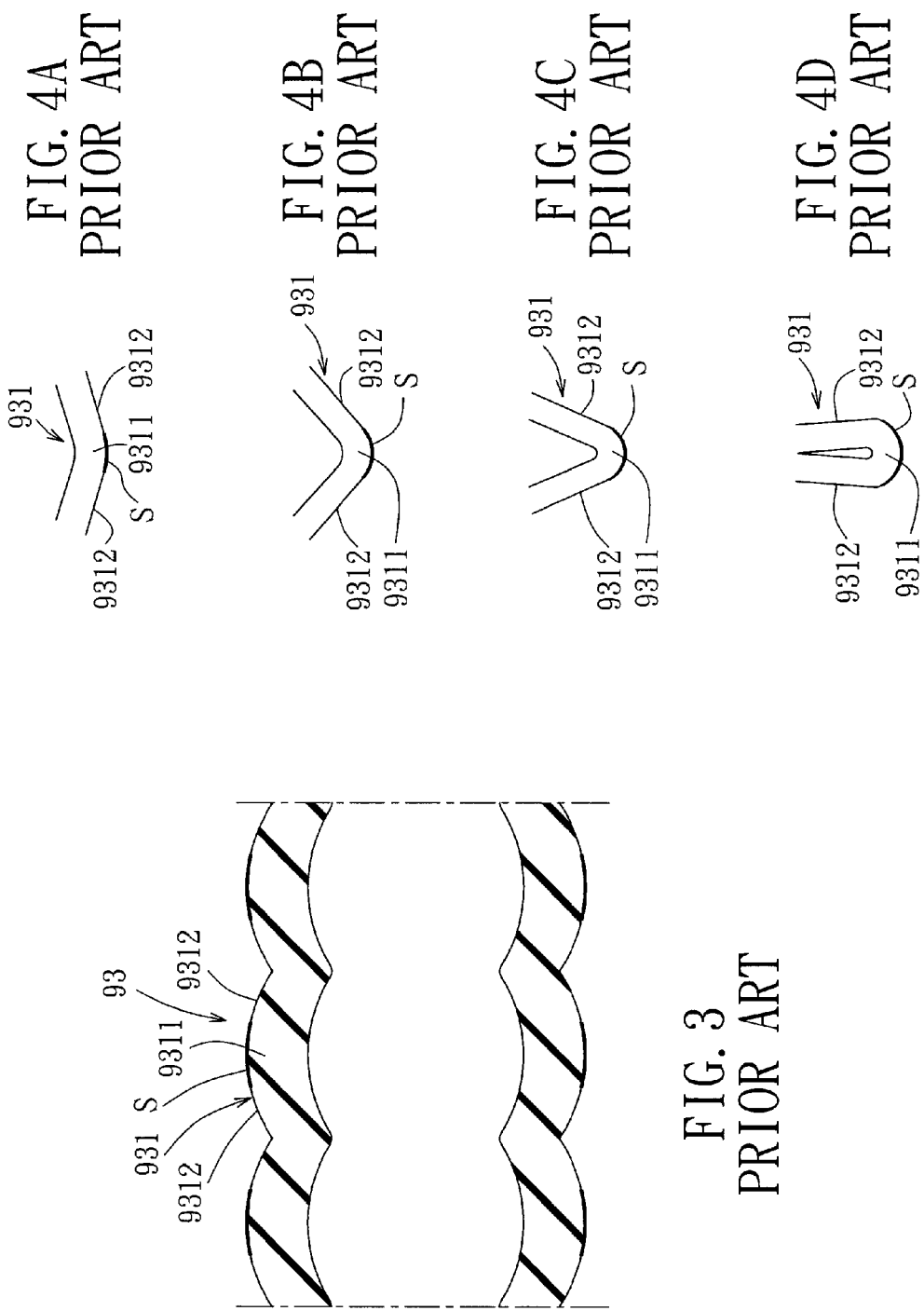

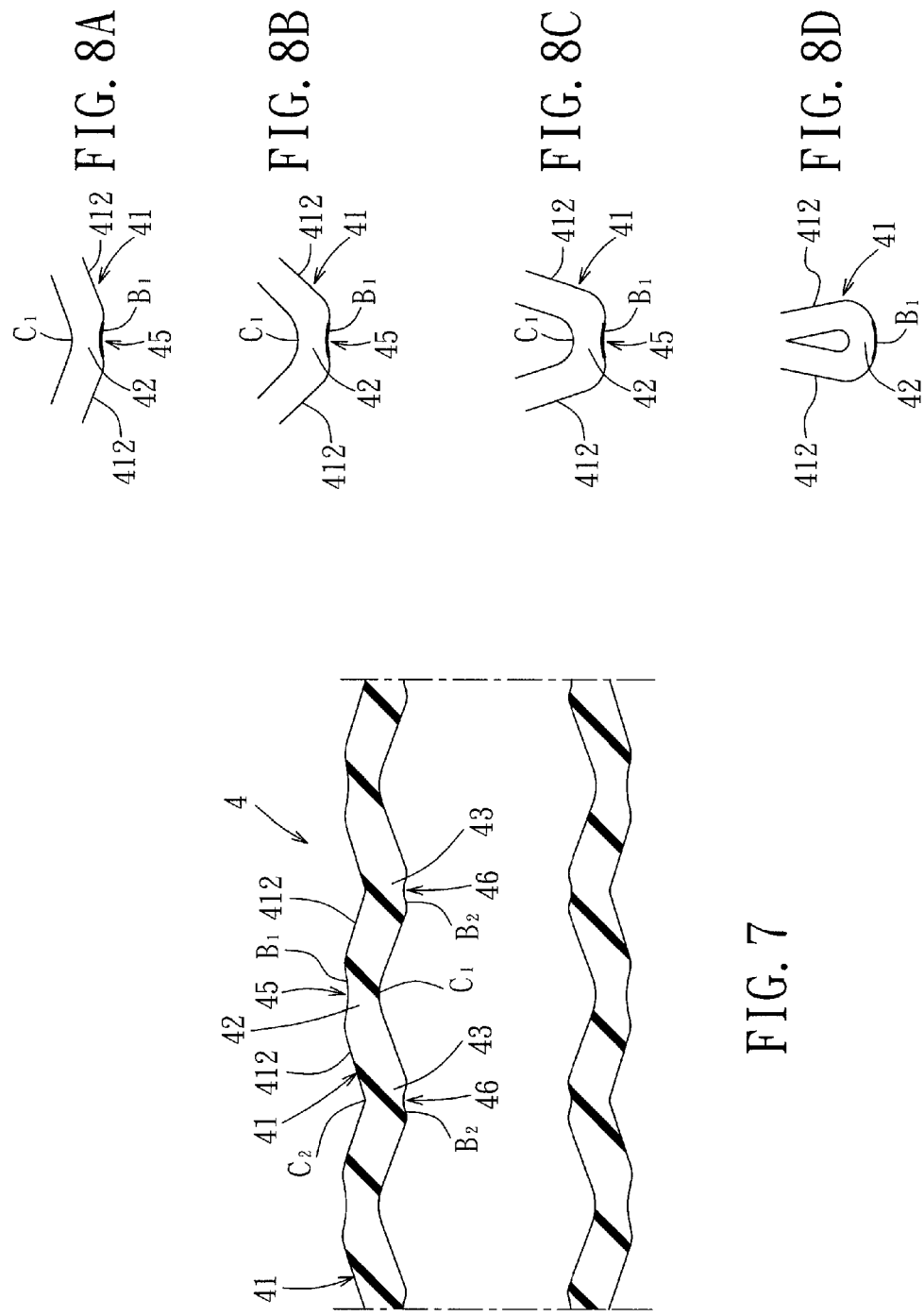

RESILIENT RETURNING DEVICE FOR A POWER OPERATED PISTON TOOL

BACKGROUND OF THE INVENTION

1. Field of the Invention

This invention relates to a resilient returning device for a power operated piston tool, more particularly to a resilient returning device having an elastic bellow-shaped body formed with a plurality of loop-shaped grooves.

2. Description of the Related Art

Referring to FIGS. 1 and 2, U.S. Pat. No. 6,824,035 discloses a power operated piston tool that includes an outer barrel 92, a guiding barrel 95 fitted in the outer barrel 92, a fastener guide 96 coupled to the outer barrel 92, a piston 91 mounted movably in the guiding barrel 95, a resilient returning device 93 disposed in the guiding barrel 95 around a piston shank 916 of the piston 91 and abutting against the fastener guide 96 and a piston head 915 of the piston 91, and a power-driving device 97 disposed at a rear end of the guiding barrel 95 and including a firing pin 971 and firing cartridges 972. After firing the firing cartridges 972 upon striking the striking pin 971, the piston 91 is driven by firing gases to drive a fastener 94 loaded in the fastener guide 96 into a wall and the resilient returning device 93 is compressed (see FIG. 2) for accumulating a restoring force to restore the piston 91 to its original position. Referring to FIG. 3, the resilient returning device is made from a rubber material and has a bellow-shaped body with a plurality of repeating arc-shaped pleats 931 that are serially interconnected. Each of the pleats 931 has two pleat halves 9312 that are moved toward each other during a compressing process of the resilient returning device 93 after firing as illustrated in FIGS. 4A to 4D. The two pleat halves 9312 cooperatively define an elbow 9311 therebetween. The resilient returning device 93 is disadvantageous in that a convex side (S) (indicated by a bold line in FIGS. 4A to 4D) of the elbow 9311 is considerably stretched when the resilient returning device 93 is disposed at a completely compressed position (see FIG. 4D). As a consequence, the convex side (S) of the elbow 9311 tends to break after the resilient returning device 93 is used for a period of time.

SUMMARY OF THE INVENTION

Therefore, an object of the present invention is to provide a resilient returning device that can overcome the aforesaid drawback associated with the prior art.

According to one aspect of the present invention, there is provided a resilient returning device for a power operated piston tool. The resilient returning device comprises a one piece elastic bellow-shaped body. The bellow-shaped body includes a plurality of repeating pleats that are serially interconnected. Each of the pleats has two pleat halves that are movable toward each other when the bellow-shaped body is compressed or away from each other when the bellow-shaped body expands, and that cooperatively define a first elbow therebetween. Each of the pleat halves of each of the pleats cooperates with an adjacent one of the pleat halves of an adjacent one of the pleats to define a second elbow therebetween. Each of the first and second elbows has a bulging side. The bellow-shaped body is formed with a plurality of loop-shaped grooves that are indented from the bulging sides of the first elbows of the pleats, respectively.

According to another aspect of the present invention, there is provided a power operated piston tool that comprises: a barrel unit; a piston mounted movably in the barrel unit; a power-driving device disposed at a rear end of the barrel unit and operatively associated with the piston for driving movement of the piston; and a resilient returning device disposed in the barrel unit, abutting resiliently against the piston and the barrel unit, and including a one piece elastic bellow-shaped body. The bellow-shaped body includes a plurality of repeating pleats that are serially interconnected.

Each of the pleats has two pleat halves that are movable toward each other when the bellow-shaped body is compressed or away from each other when the bellow-shaped body expands, and that cooperatively define a first elbow therebetween. Each of the pleat halves of each of the pleats cooperates with an adjacent one of the pleat halves of an adjacent one of the pleats to define a second elbow therebetween. Each of the first and second elbows has a bulging side. The bellow-shaped body is formed with a plurality of loop-shaped grooves that are indented from the bulging sides of the first elbows of the pleats, respectively.

BRIEF DESCRIPTION OF THE DRAWINGS

In drawings which illustrate embodiments of the invention,

FIG. 1 is a sectional view of a conventional power operated piston tool, illustrating a state before firing;

FIG. 2 is a sectional view of the conventional power operated piston tool, illustrating a state after firing;

FIG. 3 is a sectional view of a resilient returning device of the conventional power operated piston tool, illustrating a state before compressed;

FIGS. 4A to 4D are schematic views illustrating consecutive steps of how a convex side of an elbow of a pleat of the resilient returning device of the conventional power operated piston tool is stretched in a compressing process;

FIG. 7 is a sectional view of a resilient returning device of the first preferred embodiment, illustrating a state before compressed;

FIGS. 8A to 8D are schematic views illustrating consecutive steps of how a bulging side of an elbow of a pleat of the resilient returning device of the first preferred embodiment is stretched in a compressing process;

DETAILED DESCRIPTION OF THE PREFERRED EMBODIMENTS

Figure 5:
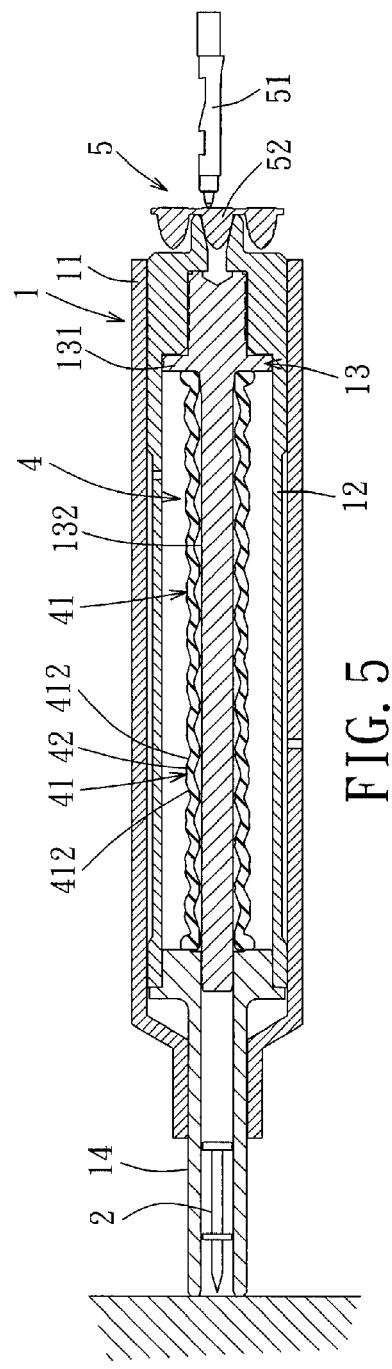
FIG. 5 is a sectional view of the first preferred embodiment of a power operated piston tool according to the present invention, illustrating a state before firing.

Before the present invention is described in greater detail with reference to the accompanying preferred embodiments, it should be noted herein that like elements are denoted by the same reference numerals throughout the disclosure.

Figure 6:
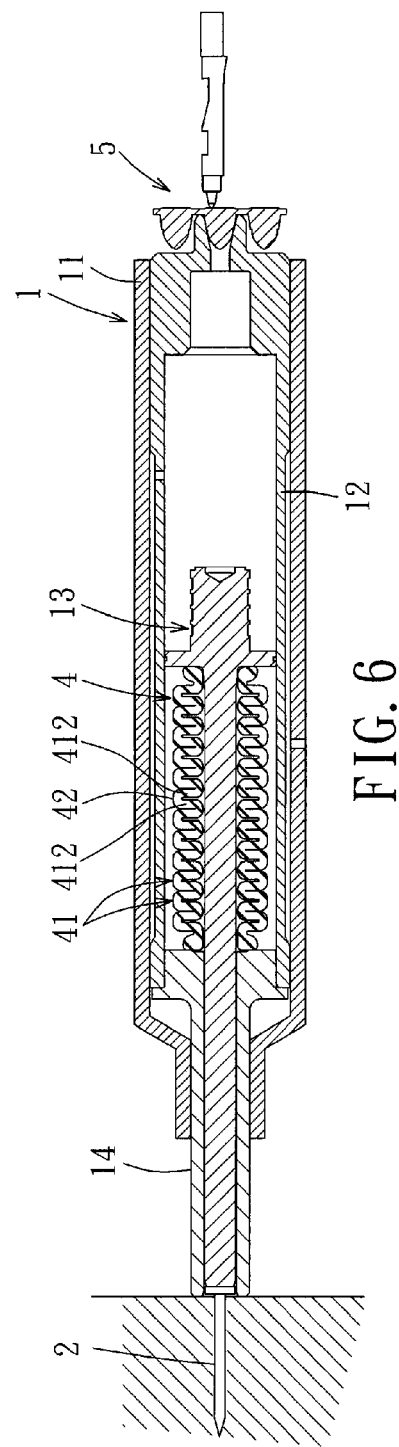
FIG. 6 is a sectional view of the first preferred embodiment, illustrating a state after firing.

FIGS. 5 to 7 illustrate the first preferred embodiment of a power operated piston tool according to the present invention. The power operated piston tool includes: a barrel unit 1; a piston 13 mounted movably in the barrel unit 1; a power-driving device 5 disposed at a rear end of the barrel unit 1 and operatively associated with the piston 13 for driving movement of the piston 13; and a resilient returning device disposed in the barrel unit 1, abutting resiliently against the piston 13 and the barrel unit 1, and including a one piece elastic bellow-shaped body 4.

With additional reference to FIGS. 7 and 8A-8D, the bellow-shaped body 4 includes a plurality of repeating loop-shaped pleats 41 that are serially interconnected. Each of the pleats 41 has two pleat halves 412 that are movable toward each other when the bellow-shaped body 4 is compressed (see FIG. 6) or away from each other when the bellow-shaped body 4 expands (see FIG. 5), and that cooperatively define a first elbow 42 therebetween. Each of the pleat halves 412 of each of the pleats 41 cooperates with an adjacent one of the pleat halves 412 of an adjacent one of the pleats 41 to define a second elbow 43 therebetween. Each of the first and second elbows 42, 43 has a bulging side $B_1$, $B_2$ and a concave side $C_1$, $C_2$ opposite to the bulging side $B_1$, $B_2$. The bellow-shaped body 4 is formed with a plurality of first loop-shaped grooves 45 that are indented from the bulging sides $B_1$ of the first elbows 42 of the pleats 41, respectively, and a plurality of second loop-shaped grooves 46 that are indented from the bulging sides $B_2$ of the second elbows 43 of the pleats 41, respectively.

The barrel unit 1 includes an outer barrel 11, a guiding barrel 12 fitted in the outer barrel 11, and a fastener guide 14 coupled securely to the outer barrel 11 and adapted to receive a fastener 2 therein.

The piston 13 is mounted movably in the guiding barrel 12 and includes a piston head 131 and a piston shank 132 extending from the piston head 131 into the fastener guide 14.

The power-driving device 5 includes a firing pin 51 and firing cartridges 52 serially interconnected and capable of generating firing gases in a rear chamber in the guiding barrel 12 upon striking the firing pin 51.

The bellow-shaped body 4 abuts resiliently against the piston head 131 and the fastener guide 14, and is made from a polymeric elastomer or a rubber material.

After firing the firing cartridges 52 upon striking the striking pin 51, the piston 13 is driven by the firing gases to drive the fastener 2 into a wall and the resilient returning device is compressed (see FIG. 6) to accumulate a restoring force to restore the piston 13 to its original position (see FIG. 5). By virtue of the presence of the first recess 45 in the first elbow 42, the bulging side $B_1$ of the first elbow 42 is only slightly stretched when the resilient returning device is compressed from an initial state (see FIG. 8A) to a completely compressed state (see FIG. 8D). In a similar manner, by virtue of the presence of the second recess 46 in the second elbow 43, the bulging side $B_2$ of the second elbow 43 is only slightly stretched when the resilient returning device is completely compressed. As a consequence, the resilient returning device of the present invention can have a longer service life than that of the aforementioned conventional resilient returning device.

Figure 9:
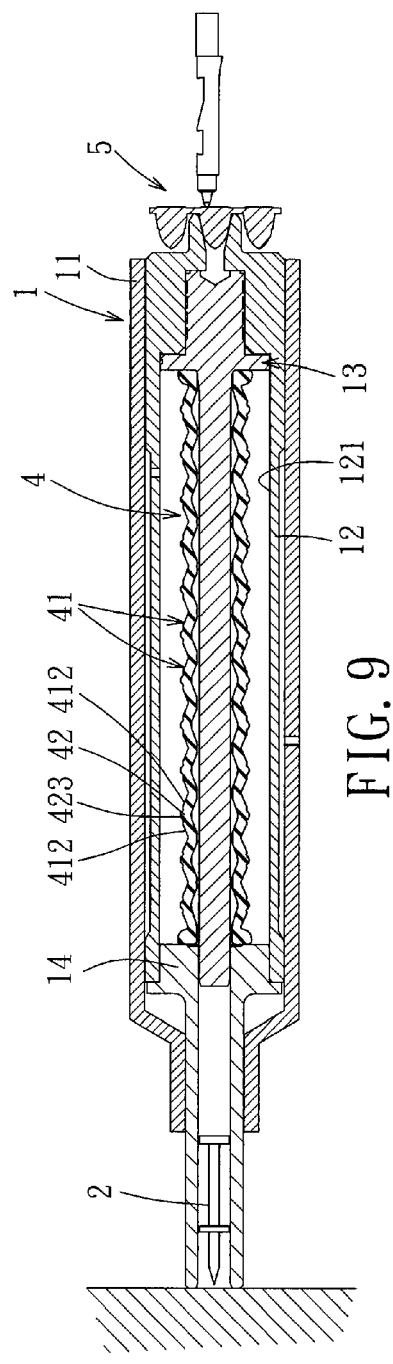
FIG. 9 is a sectional view of the second preferred embodiment of a power operated piston tool according to the present invention, illustrating a state before firing.
Figure 10:
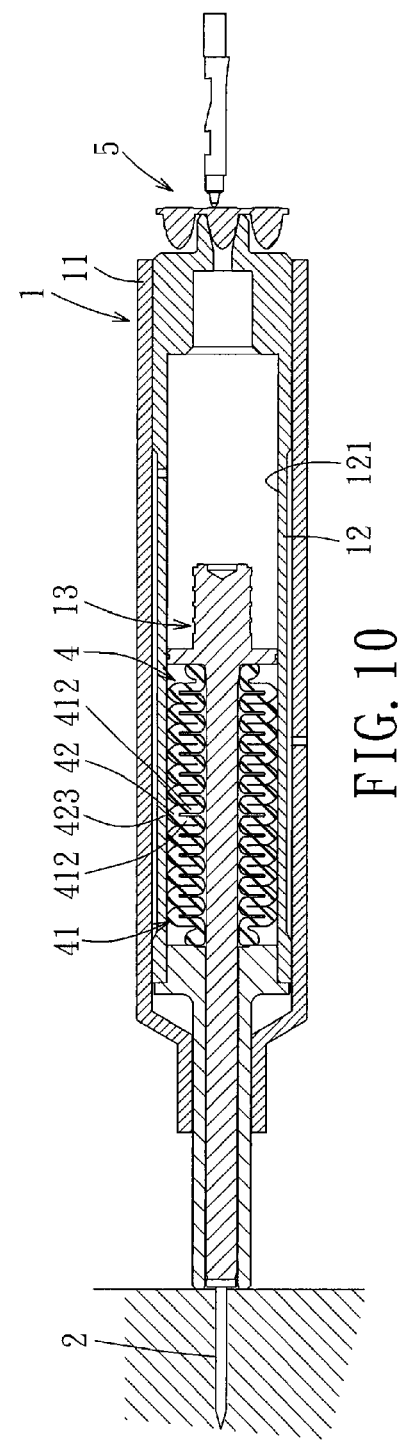
FIG. 10 is a sectional view of the second preferred embodiment, illustrating a state after firing.
Figure 11:
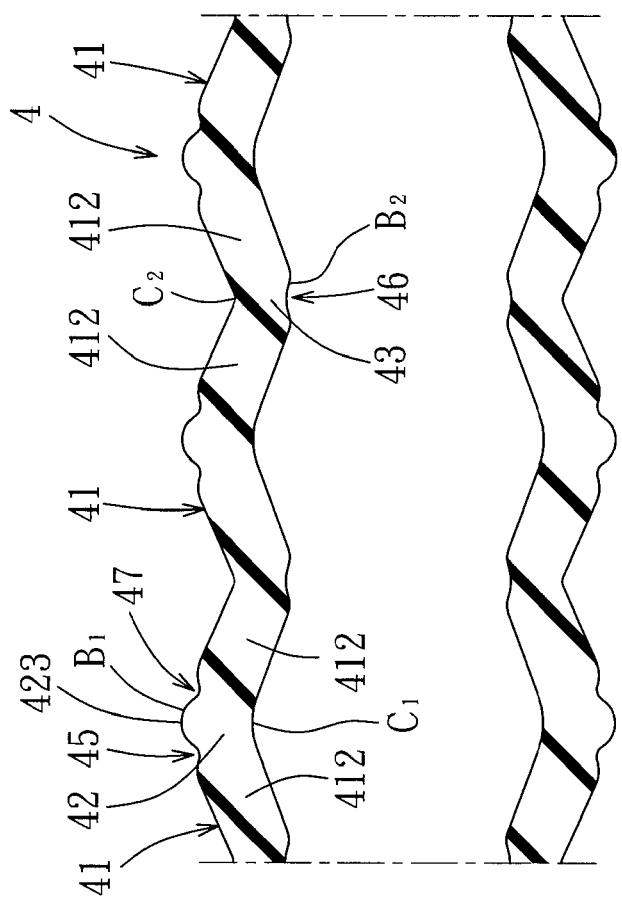
FIG. 11 is a sectional view of a resilient returning device of the second preferred embodiment, illustrating a state before compressed.

FIGS. 9 to 11 illustrate the second preferred embodiment of a power operated piston tool according to the present invention. The second preferred embodiment differs from the previous embodiment in that the bellow-shaped body 4 is further formed with a plurality of third loop-shaped grooves 47 that are indented from the bulging sides $B_1$ of the first elbows 42 of the pleats 41, respectively. Each of the first elbows 42 has an apex 423 that defines a maximum outer diameter of the loop-shaped pleats 41. The first and third loop-shaped grooves 45, 47 in each of the first elbows 42 are disposed at two opposite sides of the apex 423 of the first elbow 42 (see FIG. 11), respectively. The apex 423 of each of the first elbows 42 is spaced apart from an inner wall 121 of the guiding barrel 12 when the resilient returning device is disposed in the initial state (see FIG. 9), and abuts against the inner wall 121 of the guiding barrel 12 when the resilient returning device is disposed in the completely compressed state (see FIG. 10). With the inclusion of the first and third loop-shaped grooves 45, 47 in each of the first elbows 42, the stretching extent of the bulging side $B_1$ of the first elbow 42 can be further reduced when the resilient returning device is fully compressed as compared to that of the first preferred embodiment.

By forming the first loop-shaped grooves 45 in the first elbows 42 of the pleats 41 and/or the second loop-shaped grooves 46 in the second elbows 43 of the pleats 41 of the elastic bellow-shaped body 4 of the resilient returning device of the present invention, the aforesaid drawback associated with the conventional resilient returning device can be overcome.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power operated piston tool comprising:
    a barrel unit;
    a piston mounted movably in said barrel unit;
    a power-driving device disposed at a rear end of said barrel unit and operatively associated with said piston for driving movement of said piston; and
    a resilient returning device disposed in said barrel unit, abutting resiliently against said piston and said barrel unit, and including a one piece elastic bellow-shaped body, said bellow-shaped body including a plurality of repeating pleats that are serially interconnected, each of said pleats having two pleat halves that are movable toward each other when said bellow-shaped body is compressed or away from each other when said bellow-shaped body expands, and that cooperatively define a first elbow therebetween, each of said pleat halves of each of said pleats cooperating with an adjacent one of said pleat halves of an adjacent one of said pleats to define a second elbow therebetween, each of said first and second elbows having a bulging side;
    wherein said bellow-shaped body is formed with a plurality of first loop-shaped grooves that are indented from said bulging sides of said first elbows of said pleats, respectively and
    wherein each of said pleat halves gradually converge along the length of the elastic bellow-shaped body from the first elbow to the second elbow.

2. The power operated piston tool of claim 1, wherein said bellow-shaped body is further formed with a plurality of second loop-shaped grooves that are indented from said bulging sides of said second elbows of said pleats, respectively.

3. The power operated piston tool of claim 1, wherein said bellow-shaped body is further formed with a plurality of third loop-shaped grooves that are indented from said bulging sides of said first elbows of said pleats, respectively.

4. The power operated piston tool of claim 1, wherein said bellow-shaped body is made from one of a polymeric elastomer and a rubber material.

* * * * *